(12) United States Patent
Karol (10) Patent No.: US 8,472,313 B2
(45) Date of Patent: Jun. 25, 2013

(54) SYSTEM AND METHOD FOR OPTICAL BYPASS ROUTING AND SWITCHING

(75) Inventor: Mark Karol, Fair Haven, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 338 days.

(21) Appl. No.: 12/787,600

(22) Filed: May 26, 2010

(65) Prior Publication Data

US 2011/0129222 A1 Jun. 2, 2011

Related U.S. Application Data

(60) Provisional application No. 61/254,778, filed on Oct. 26, 2009.

(51) Int. Cl.
*G01R 31/08* (2006.01)
(52) U.S. Cl.
USPC ...................................... 370/225; 370/395.21
(58) Field of Classification Search
USPC ............................................. 370/225, 395.21
See application file for complete search history.

(56) References Cited

U.S. PATENT DOCUMENTS

| | | | |
|---|---|---|---|
| 6,262,976 B1 | 7/2001 | McNamara | |
| 6,859,435 B1 | 2/2005 | Lee et al. | |
| 6,999,459 B1 * | 2/2006 | Callon et al. | 370/400 |
| 2002/0029271 A1 * | 3/2002 | Schwager | 709/226 |
| 2006/0104210 A1 | 5/2006 | Nielsen | |
| 2006/0153496 A1 | 7/2006 | Tanobe et al. | |
| 2007/0206547 A1 | 9/2007 | Gong et al. | |
| 2011/0176438 A1 * | 7/2011 | Sanita et al. | 370/252 |

OTHER PUBLICATIONS

Patent Cooperation Treaty International Search Report, Dec. 9, 2010.

* cited by examiner

*Primary Examiner* — Sai-Ming Chan
(74) *Attorney, Agent, or Firm* — Philip J. Feig (57) ABSTRACT

Optical bypass circuits are selected and created with a desired amount of traffic on each circuit to offload from the IP routers, the maximum possible amount of traffic. In a first phase, each node in a network independently determines the maximum number of optical bypass circuits, configured to their maximum capacity, to as many destinations, that could possibly originate at that node. The determination is made by aggregating traffic from a given traffic matrix. The optical bypass circuit transports traffic that originates at the node plus transient traffic that the node receives from other nodes. In the second phase, the node will eliminate an optical bypass circuit found in the first phase if any of its parent nodes created a necessarily longer optical bypass circuit to the same destination. In addition, if a descendent node has more aggregate traffic to fill more bypass circuits than the parent node, then the extra optical bypass circuits from the descendent node are also created.

20 Claims, 8 Drawing Sheets

SYSTEM AND METHOD FOR OPTICAL BYPASS ROUTING AND SWITCHING

CROSS REFERENCE TO RELATED APPLICATIONS

This application claims the benefit of the filing date of U.S. Provisional Application No. 61/254,778, filed on Oct. 26, 2009, the disclosures of which are incorporated herein by reference.

STATEMENT REGARDING FEDERALLY SPONSORED RESEARCH OR DEVELOPMENT

Funding for research was made with Government support under HR011-09-C-0024 awarded by the Defense Advanced Research Projects Agency (DARPA). The Government has certain rights to this invention.

BACKGROUND

1. Field of the Invention

The present invention relates generally to the field of communication networks, and more particularly to the design of optical bypass routing and switching in communication networks.

2. Description of the Related Art

The increasing popularity of the Internet has increased traffic demands on the backbone networks supporting the Internet. The enormous growth of the data traffic on the backbone networks stresses the transmission bandwidth and burdens the processing capability of the electronic routers, switches, and multiplexers used in the backbone network. Optical technology has been seen as a promising solution to overcome this electronic bottleneck. For example, the use of Wavelength Division Multiplexing in optical fiber channels has the capability of increasing transmission rates to 100 Gigabits/second per wavelength. However, this increased transmission rate will burden the existing electronic routers and switches used in nodes of the network. Optical bypass has been considered as a method to offload traffic from the electronic routers. This is possible since it is not necessary for a node to process all the traffic that passes through it destined for other nodes. Although the emergence of optical bypass techniques appears to be a promising solution, there are challenges in incorporating these techniques in an IP network.

BRIEF SUMMARY

This Summary is provided to introduce a selection of concepts in a simplified form that are further described in the Detailed Description below. This Summary is not intended to identify essential features of the invention or claimed subject matter, nor is it intended to be used in determining the scope of the claimed subject matter.

The present invention pertains to systems and methods for allocating optical bypass circuits in a network. In an embodiment, the system is an arbitrary mesh IP network having fixed routing and general traffic patterns. The optical bypass circuits are selected and created with a specified amount of traffic on each circuit to offload from the IP routers, the maximum possible amount of traffic. Optical bypass modules, including components such as optical cross connects, are placed next to IP routers to achieve the bypass capability.

The method is achieved in two phases. In the first phase, each node independently determines the maximum number of optical bypass circuits, each configured to carry a specified amount of traffic, to as many destinations, not necessarily final destination nodes of the traffic demand, that could possibly originate at that node. Each optical bypass circuit has some specified bandwidth, such as a high percentage of a wavelength's full capacity. The optical bypass circuit transports traffic that originates at the node plus transient traffic that the node receives from other nodes. In other words, all traffic is considered, such as the traffic originating and passing through a node. In the second phase, each node will eliminate an optical bypass circuit found in the first phase if any of its parent nodes, according to the network routing tree, found a necessarily longer optical bypass circuit to the same, not necessarily final, destination. In addition, if the descendent node finds in the first phase more bypass circuits than its parent nodes, because the descendent node has more aggregate traffic to the destination than its parent nodes, then the extra optical bypass circuits from the descendent node are also created.

BRIEF DESCRIPTION OF THE DRAWINGS

The subject matter disclosed is illustrated by way of example, and not by way of limitation, in the figures of the accompanying drawings in which the like reference numerals refer to similar elements and in which.

DETAILED DESCRIPTION

Figure 1:
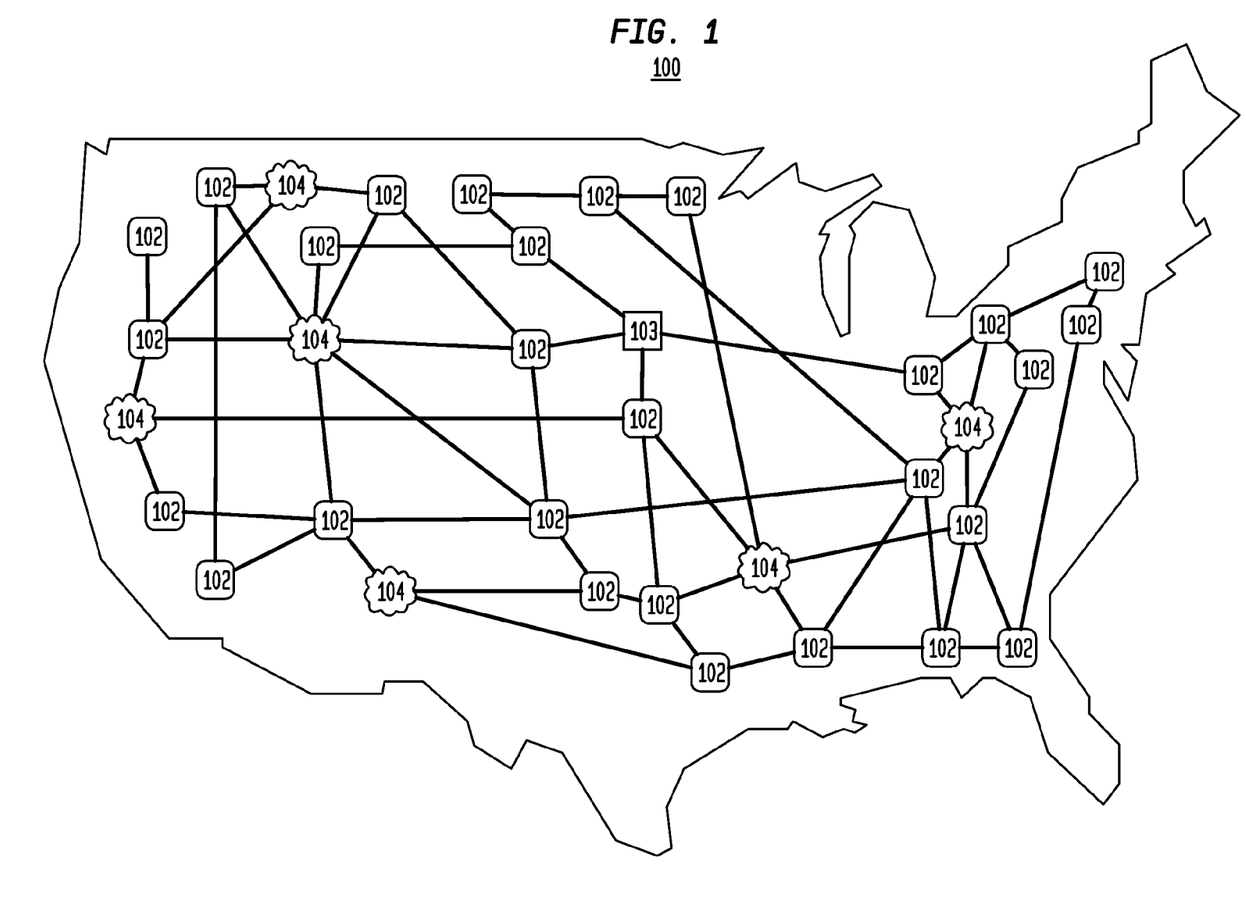
FIG. 1 is a schematic diagram of an arbitrary mesh network in accordance with an embodiment.

FIG. 1 illustrates an embodiment of a network configuration utilizing the technology described herein. There is shown an arbitrary mesh network 100 composed of a number of nodes, 102, and networks 104, interconnected to each other to facilitate the transmission of data packets within the network 100. The network 100 can be a core or backhaul network. The network 100 employs an arbitrary mesh topology wherein each node 102 in the network 100 is connected to one or more nodes 102 in the network 100. The connection between nodes 102 in the network 100 is dynamic and can be reconfigured in the event of broken or blocked paths. Nodes 102 in a mesh network do not require a direct connection between all the other nodes 102, rather the connection can be made through multiple hops through intermediate nodes.

The nodes 102 can be connected to other networks 104 and can facilitate communication between the different networks 104. The nodes are connected via any type of communication links, such as optical links, wireless links (e.g., radio link, microwave, etc.), wired links, and any combination thereof. In an embodiment, the network 100 has optical links in combination with wired communications links (e.g., telecommunications links, etc.). The nodes in the network can be routers, hubs, switches, servers, host computers, other networks (e.g., LANs, WLANs, private networks, etc.), or other network elements.

However, it should be noted that the technology described herein is not constrained to any particular network configuration, topology, or network components. The technology can be adapted to suit other network configurations and topologies, such as without limitation, ad hoc networks, MANETs, ring topologies, etc. and in configuration with other network components.

There can be one or more central nodes or central controllers 103 within the network 100. The central controllers 103 can be used to supervise and control certain activities within the network 100. Alternatively, the network 100 can utilize a distributed network control mechanism where each node contains processes that facilitate the supervisory and control activities within the network.

In an embodiment, the Internet Protocol ("IP") is used to enable communications within the network 100. IP is a packet-switched protocol that specifies how to segment data into packets with a header that specifies a source and a destination. IP is a connectionless transmission where a virtual circuit does not need to be established before the data transfer can begin. The IP layer in each router maintains a routing table that is used to determine how to handle an IP packet. The routers work together to route packets from a source to a destination through a series of hops through the network. The IP routing protocol computes the routing path according to the routing information that is maintained in the routing table. The information in the routing table can be statically configured using static routes or dynamically configured by exchanging information with other routers in the network.

There are various IP routing protocols that can be used in the network 100. One such IP routing protocol is the link state routing protocol. In the link state routing protocol, each router stores the entire network topology and computes the shortest path. When the state of the network changes, all nodes are informed by broadcast of update messages to all nodes in the network. However, the technology described herein can utilize any particular IP routing protocol.

Figure 2:
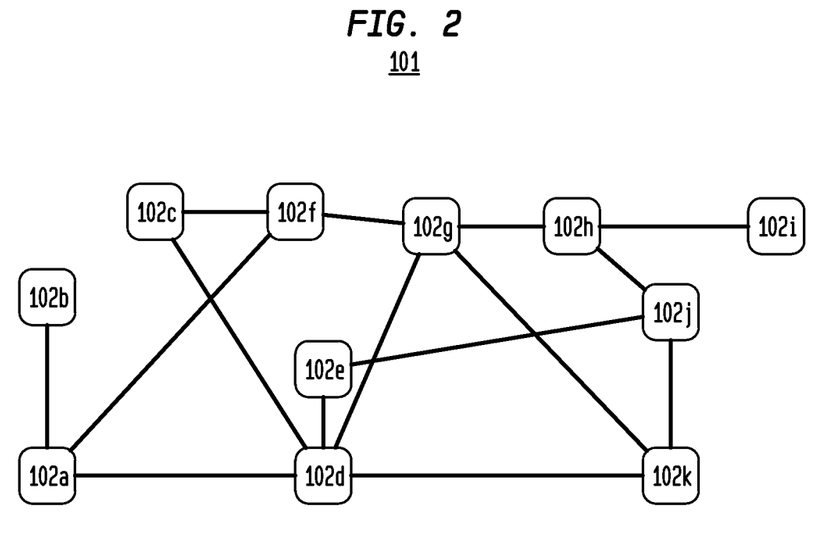
FIG. 2 is a schematic diagram of an exemplary portion of the network shown in FIG. 1.
Figure 3:
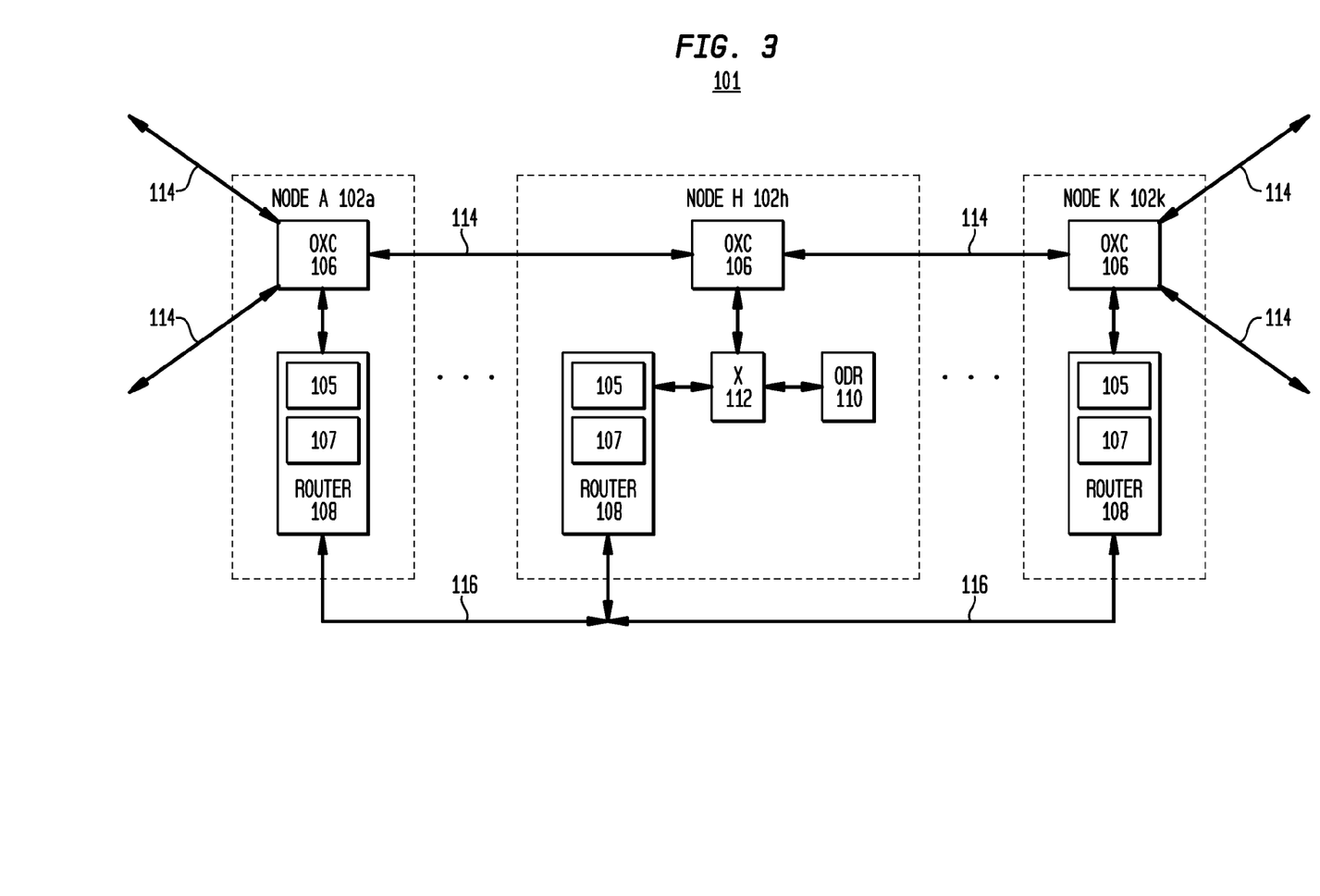
FIG. 3 is a schematic diagram of a portion of the network shown in FIG. 2 including optical bypass circuits in accordance with an embodiment.

FIG. 2 illustrates a schematic diagram of a portion 101 of the network 100. FIG. 3 illustrates an optical bypass circuit configuration for that portion of the network 101. As shown in FIGS. 2 and 3, there is shown several nodes 102a-102k in the network 101 which are connected to other nodes. Nodes 102a, 102h, 102k contain an optical bypass module consisting in this example of an optical cross connect 106 ("OXC") which is used to establish an optical bypass circuit. As shown in FIG. 3, there is an optical bypass circuit that travels from node 102a to node 102h and another optical bypass circuit that travels from node 102h to node 102k. An optical bypass circuit is used to denote an end-to-end optical connection that is established between two nodes.

Nodes 102a, 102h, 102k contain a router 108 that can be coupled to an OXC 106. The router 108 is a network device that can route and forward data packets, in the form of electrical signals, from one node 102 in the network 100 to another node, through a communications link 116. Each router 108 can contain a routing table 105 and a traffic matrix 107. The routing table 105 contains the routes to particular network destinations. The routing table 105 lists all reachable destinations and the addresses of the next node along the path to those destinations. Each packet is transmitted to the next hop until it reaches its final destination. At a minimum, the routing table contains at least the destination node identifier and the next hop or address of the next router to which the packet is to be sent on the way to its final destination. The traffic matrix 107 provides for every ingress point into a node and every egress point out of the node, the volume of traffic over a given time interval.

Alternatively, as shown in node 102h, a node can include a router 108 coupled to an OXC 106 through a patch panel X, 112. The node 102h can also include an optical data router ("ODR") 110, which is coupled to the OXC 106 through the patch panel X, 112.

The optical cross connect ("OXC") 106 is an optical networking device that can switch optical signals coming in on a wavelength of an input fiber link to the same wavelength in an output fiber link. An optical communication channel is the optical transport mechanism and is commonly referred to as a lightpath or wavelength channel denoted as $\lambda$-channel. The optical bypass circuit is established over a network of OXCs, which may span a number of fiber links or physical hops.

Figure 4:
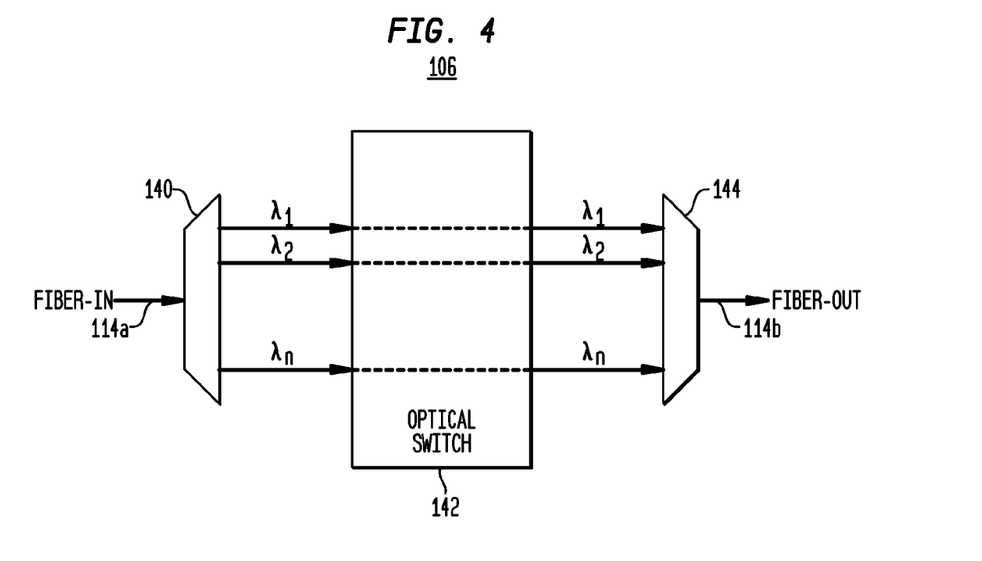
FIG. 4 is a schematic diagram of an exemplary optical cross connect circuit.

FIG. 4 is a more detailed diagram of an exemplary OXC 106. The OXC 106 is coupled to a fiber link 114 that is composed of several wavelengths, $\lambda_1, \lambda_2, \ldots, \lambda_n$. A demultiplexer 140 is used to select one wavelength from the fiber link 114 that is transmitted to the optical switch 142. The optical switch 142 is used to couple an optical signal coming in on a wavelength of an input fiber link 114a to the same wavelength in an output fiber link 114b. If the OXC 106 does not have any wavelength converters, then the input wavelength, $\lambda_1$, is associated with the same wavelength, on each hop. If the OXC 106 has wavelength converters, a different wavelength on each hop can be used to create an optical bypass circuit. A multiplexer 144 is used to combine the outgoing wavelengths onto the output fiber link 114b.

An OXC 106 can have multiple input fiber links and multiple output fiber links. The coupling of input optical signals (on a particular wavelength on an input fiber) to output optical signals (on a particular wavelength on an output fiber) is reconfigurable. The ability to reconfigure the connections through OXCs is one means of establishing the desired optical bypass circuits.

Figure 5:
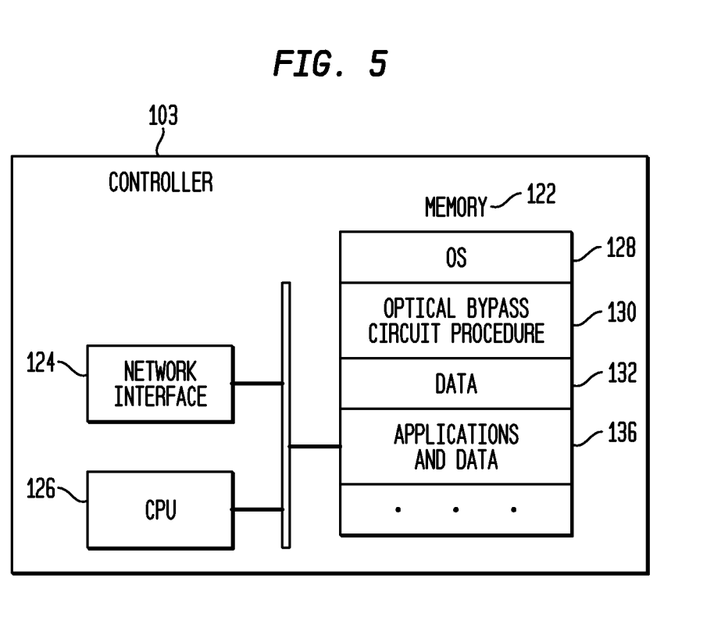
FIG. 5 is a schematic diagram of a memory element of a network controller in accordance with an embodiment.

FIG. 5 is a schematic diagram of an embodiment of the controller 103. Alternatively, the controller can be distributed in the routers in the network 100. The controller 103 has, at a minimum, a memory 122, a network interface 124 for facilitating network communication, and a processor or CPU 126. The memory 122 can be a computer readable storage medium that can store executable procedures, applications, and data. It can be any type of memory device (e.g., random access memory, read-only memory, etc.), magnetic storage, volatile storage, non-volatile storage, optical storage, DVD, CD, and the like. The memory 122 can also include one or more external storage devices or remotely located storage devices. The memory 122 can contain instructions and data as follows:

an operating system 128;
an optical bypass circuit procedure 130;
data 132; and
other applications and data 136.

Attention now turns to a more detailed description of embodiments of the methodology used to create and allocate optical bypass circuits to offload transmission traffic from the IP routers.

Figure 6:
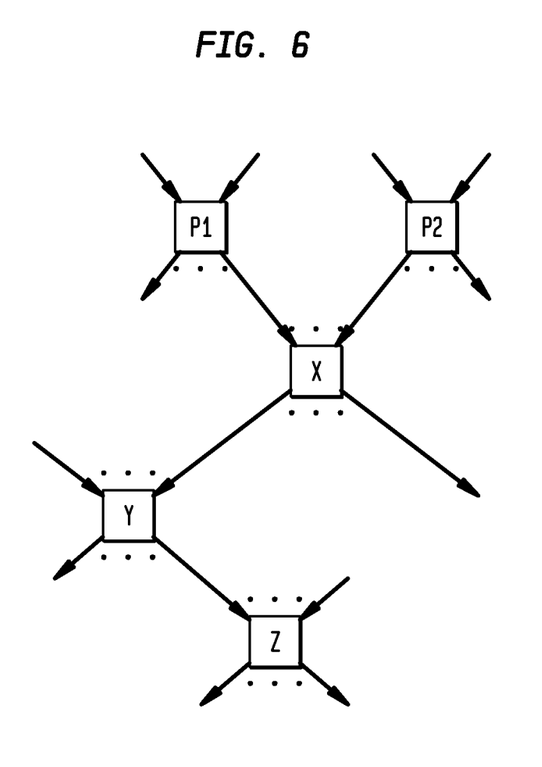
FIG. 6 is a schematic diagram illustrating an exemplary routing tree.

The methodology described herein identifies and allocates the optical bypass circuit bandwidth to meet the network's demands. There are two phases to this method. Referring to FIG. 6, in the first phase, each node X independently determines the maximum number of optical bypass circuits, each configured to carry a specified amount of traffic, to as many destinations (not necessarily final destinations of the traffic), that could possibly originate at X. An optical bypass circuit transports traffic that originates at node X plus transient traffic that X receives from other nodes. All traffic is considered, such as the traffic originating and passing through a node. In the second phase, node X will eliminate an optical bypass circuit found in the first phase if any of its parent nodes P (according to the network routing tree) found in the first phase a necessarily longer optical bypass circuit to the same destination. This second phase comparison is done (in parallel) at all network nodes.

In Phase 1, control messages are sent from a node X to all its neighbors (its descendents in the routing tree). On each of its output links, X sends a message with a list of the total traffic flows (e.g., source-destination "identifiers" and aggregate amounts of traffic) on that link destined to each other network node—provided the aggregate traffic exceeds a specified threshold (e.g., the desired loading of each bypass circuit). When a node Y receives this message, it "splits and forwards" the incoming traffic list to its appropriate output links according to the destination nodes of the traffic flows. At node Y, these filtered sets of traffic-flow information (from X to other nodes) are then sent downstream to the next nodes. This continues until the remaining aggregate traffic (that started with the node X message) to a given destination node D falls below the specified threshold (i.e., desired loading of each bypass circuit). This occurs either when the control message reaches the final specified destination D, or at some node W prior to reaching D. At that point, a message is sent in the reverse direction (i.e., up the network routing tree) to X so that all the intermediate nodes can configure their optical bypass modules to create the bypass circuit to node D or alternatively node W. In Phase 2, described next, the starting node of this bypass circuit to D (or alternatively W) is determined. The starting node will either be X or an ancestor of X.

In Phase 2, each node tells each of its descendents the list of fully utilized bypass circuits that it identified in Phase 1. Then, if any node learns that any one of its parents was able to establish during the first phase a bypass circuit to the same end node, then the descendent node does not become the start node for the circuit to that end node. There is no need because all that traffic is "subsumed" by a longer bypass circuit (that starts at P or one of P's ancestors). If the descendent node X during the first phase finds more circuits than its parent P, then these extra circuits from X will start at X.

After Phase 2, the following result is obtained. For all nodes X, the router at Y, and nodes Z, if the total amount of traffic (i.e., all source-destination pairs) on Y router's input link X->Y destined for Y router's output link Y->Z exceeds a specified threshold (e.g., the desired loading of each bypass circuit), then that traffic from X to Z will bypass the router at Y.

Figure 7:
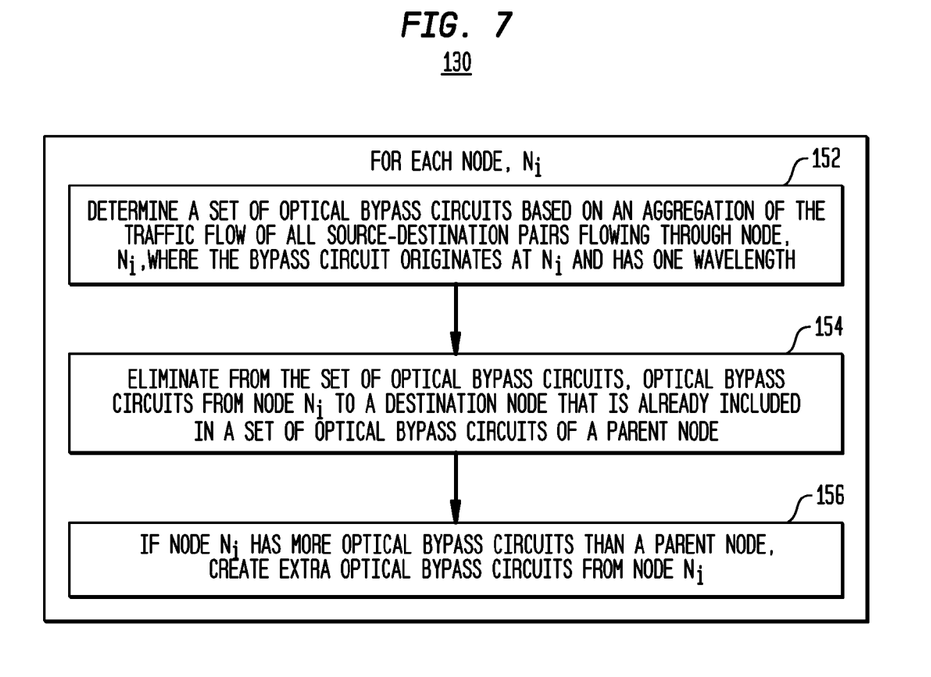
FIG. 7 is a flowchart illustrating steps used in the optical bypass circuit procedure in accordance with an embodiment.
Figure 8:
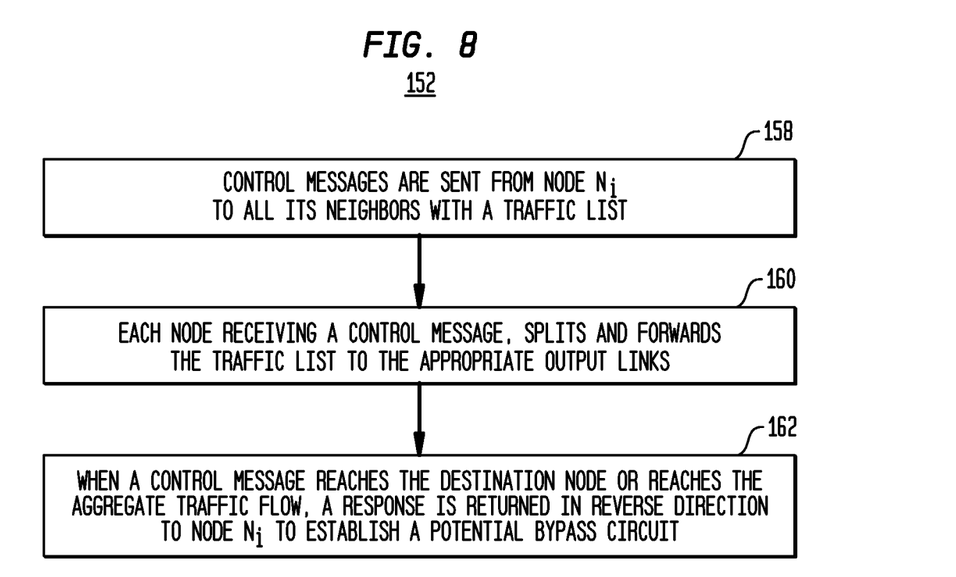
FIG. 8 is a flowchart illustrating steps used in a first phase of the optical bypass circuit procedure in accordance with an embodiment.
Figure 9:
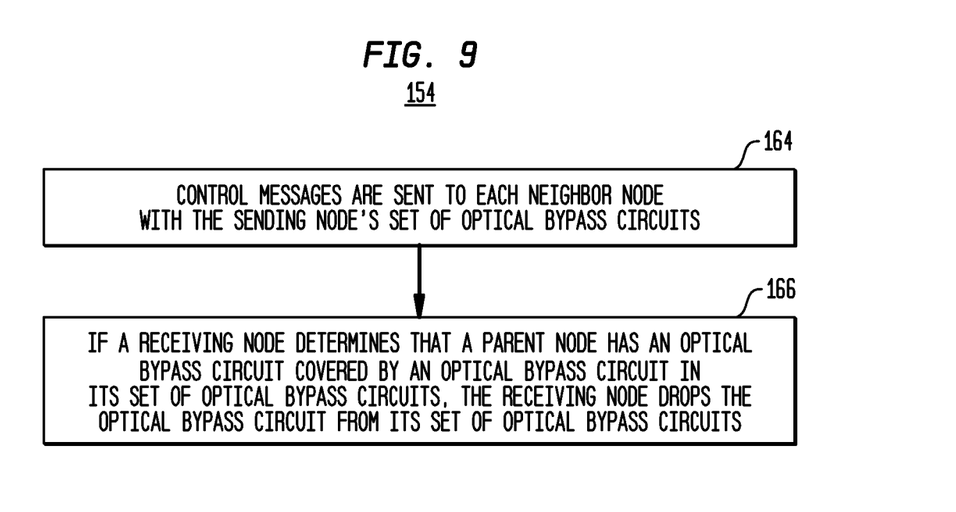
FIG. 9 is a flowchart illustrating steps used in the second phase of the optical bypass circuit procedure in accordance with an embodiment.

Turning to FIG. 7, the optical bypass circuit procedure 130 has each node, $N_i$, simultaneously determine a set of optical bypass circuits that can be established based on an aggregation of the traffic flow through each node, $N_i$ (step 152). Each node determines the set of optical bypass circuits that could originate at their respective node, each configured to carry a specified amount of traffic. As shown in FIG. 8, each node sends out control messages to each of its descendent neighbors (step 158). The control messages contain a traffic list detailing the source-destination pairs that flow through the node and the corresponding traffic flow information. The node's routing table is used to determine the node's descendent neighbors. The source-destination pairs contain the source and destination identifiers. Each node that receives the control message appropriately splits information in the traffic list and forwards control messages to each of its descendent neighbors, towards the respective destinations listed in the traffic list (step 160). A control message will either reach its respective final destination node or, alternatively, reach a node at which the remaining aggregate traffic, in the traffic list, falls below the specified threshold. The specified threshold can be the desired loading of each bypass circuit, typically a high percentage of a wavelength's capacity. The last hop or final destination node will then respond to the originating node with a reply message. The reply message will update the traffic list with the traffic flow for each source-destination pairs (step 162). This identifies the phase one potential optical bypass circuits to that last hop or final destination node.

Referring back to FIG. 7, the originating node, $N_i$, then eliminates from its set of optical bypass circuits, those source-destination pairs from node $N_i$ to a destination node that is already included in the set of optical bypass circuits of a parent node (step 154). As shown in FIG. 8, each node sends control messages to each descendent neighbor node with the sending node's set of optical bypass circuits (step 164). If a receiving node determines that one of its parent's nodes have a source-destination pair that is covered by an optical bypass circuit to the same destination that is found in the receiving node's set of optical bypass circuits, the receiving node drops the optical bypass circuit from its set of optical bypass circuits (step 166).

Referring back to FIG. 7, the originating node then determines if it has more optical bypass circuits than its parent's node. In this case, the originating node creates extra optical bypass circuits from itself to cover the same source-destination pairs (step 156).

The technology described herein provides the maximum amount of bypass for a given traffic matrix, topology, and routing protocol. Below are some examples of the performance gains for a few simple network topologies with uniform traffic patterns. These performance results are analytically derived. The gains are even more substantial as the number of network nodes, wavelengths (which can be assigned to carry bypass traffic), and traffic loads are increased.

In a cube topology where there are eight OXC nodes interconnected with three wavelengths per (directional) edge. Attached to each OXC is an IP router. In other words, each OXC has three direct wavelength connections to each of three other OXCs (for a total of nine output wavelength channels to other OXCs). Without any bypass there would only be direct connections between neighboring IP routers (through the OXCs). Then, the average number of hops from source IP router to destination IP router is (12/7) and the maximum (normalized) traffic input per node is (7/4); i.e., (7/12) on each of the OXC's output wavelength channels. On each output channel, the other (5/12) is used for transit traffic. Consequently, without any bypass, (5/12)=42% of each router's capacity/processing is spent on transit traffic.

With the technology described herein, two of the wavelengths (per directional edge) are used to establish direct connections between all pairs of IP routers that were originally two hops apart in the cube topology. (Note: in this example with just three wavelengths, there are not enough wavelengths to also directly connect IP routers that were originally three hops apart.) Now only 12% of each router's capacity/processing is spent on transit traffic because the maximum (normalized) traffic input is (7/8) on each of the OXC's output wavelength channels and only (1/8) is needed to handle transit traffic. In addition, the size of the IP routers is reduced from 9×9 (without bypass) to 6×6 (with bypass), not counting its local input/output ports.

Now suppose N OXCs (and their associated IP routers) are interconnected in a ring topology with W wavelength channels in each direction (clockwise and counter-clockwise). For large N, the maximum total throughput is approximately (8W) and the maximum throughput per node is (8W/N). Consequently, without any bypass, each IP router is of size 2W×2W (plus local input/output ports), (8W/N)/(2W) (4/N) is the maximum (normalized) input traffic per wavelength channel, and 1−(4/N) is the fraction of each router's capacity/processing spent on transit traffic.

With the technology described herein in the ring topology, the required IP router size can be reduced down to just 4×4 (plus local input/output ports). In this configuration, each IP router has direct connections to its two nearest neighbors (clockwise and counter-clockwise on the ring) plus two maximal-length bypass circuits (of length W−1 in each direction). In addition, only 1−(2W/N) of each router's capacity/processing is spent on transit traffic.

The embodiments of the systems and methods described herein can be used for the selection and creation of optical bypass circuits which can be used in network design and capacity provisioning. They can also be used for real-time dynamic sharing of circuit capacities (using rapid circuit-setup control protocols). The methods are applicable for any given topology, routing algorithm, and traffic matrix. For every node and every one of its input-output link pairs, if there is sufficient traffic to bypass the node, then that traffic will be part of some bypass circuit. This implies that the circuits are also "maximal length," which increases the amount of optical bypass circuits in the network. The embodiments of the methods can be implemented by one or more central nodes or central controllers 103, if it has all the necessary topological and traffic information. Alternatively, a distributed control of the methods can be implemented whereby the optical bypass circuits are created by simply passing local control messages between the network nodes. In this embodiment, the network nodes do not need to know the complete network topology, routing, or traffic matrix.

Although there likely are many distinct traffic flows between a source and destination node, the method only needs to consider the aggregate of all such flows (i.e., "how much" traffic there is on each network link). In the methodology described herein, the optical bypass circuits are shared by all the traffic from a source to destination node. Considering the aggregate traffic simplifies the method and maximizes the amount of traffic that is offloaded by the optical bypass circuits. Also, when the optical bypass circuits are created, there is no change in the "physical route" of the packets from source to destination; at some nodes, there is only a change in some hops through the IP routers to the OXCs. This helps reduce the end-to-end delay jitter (because propagation delays dominate in these high-speed networks) in situations where mid-call cutover is enabled and permitted to/from the optical bypass circuits whenever there is sufficient traffic. This helps in scenarios where the aggregate traffic from a source to a destination node is split so that only a portion goes through the created optical bypass circuits.

Since packets sent over end-to-end optical bypass circuits/wavelengths are assumed to not suffer packet loss, another important advantage gained by the use of the optical bypass is a reduction in the overall network packet loss probability. Further reduction is possible if the load on the remaining packet wavelengths is reduced. This is due to the fact that the effective loading can be higher on the end-to-end optical bypass circuits than on the point-to-point wavelengths between TP routers, due to contention and buffering. This load reduction on the routers is particularly beneficial when deploying ODRs in the network since they currently are of small size and have very limited optical buffering capabilities (e.g., only tens of short optical cells). The performance gains depend on the number of wavelengths per fiber (more generally, the number of bypass channels at each node). In the limit, if the number of wavelengths is extremely large, it would be possible to create a fully connected logical topology of only optical bypass circuits.

The foregoing description, for purposes of explanation, has been described with reference to specific embodiments. However, the illustrative teachings above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The methodologies described herein can be used to bypass other network components other than IP routers, such as optical data routers. Furthermore, the optical bypass circuit procedure can be repeated multiple times where at each iteration, there are decreasing bandwidth allocations to create a multi-layer hierarchy of different rate bypass circuits in the network. In addition, the methodology described herein can also be utilized for any type of bypass circuits and is not limited to just optical bypass circuits.

What is claimed is:

1. A method for generating bypass circuits in a network, comprising:
   associating a plurality of nodes with the network, each node having traffic from one or more source-destination pairs and associated with a traffic list for each source-destination pair;
   calculating an aggregate traffic flow, for each node in the network, for all the source-destination pairs flowing through the node; and
   determining a set of bypass circuits, for each node in the network, if the aggregated traffic flow for a specific source-destination pair is larger than a preset threshold, each bypass circuit is associated with a select source node and a select destination node, wherein the select source node and the select destination node need not be a source-destination pair and wherein a sub-set of traffic for the specific source-destination pair is diverted through at least one bypass circuit of the set of bypass circuits and a remaining portion of the traffic for the specific source-destination pair is transmitted via a regular path determined by a local routing table.

2. The method of claim 1, further comprising:
   for each node, eliminating from the node's set of bypass circuits, bypass circuits included in a parent node's set of bypass circuits.

3. The method of claim 1, wherein the calculating step further comprising:
   transmitting control messages to each descendent node, the control messages including a unique traffic list related to each descendent node, if the aggregate traffic flow on a link to the descendent node is larger than the preset threshold; and
   filtering the traffic list with local traffic flow information, by each node receiving the transmitted control message, by dividing the unique traffic list based on destination identifiers in the unique traffic list into separate link specific traffic lists for each descendent node connected to the node receiving the transmitted control message, and for each link having an aggregate traffic flow larger than the preset threshold value, transmitting a second control message with a corresponding link specific traffic list to a corresponding descendent node.

4. The method of claim 3, further comprising:
reaching a destination node; and
generating a bypass circuit for the destination node, wherein the bypass circuit is terminate when the calculated aggregate traffic flow for a source-destination pair is less than the preset threshold, wherein the traffic is routed from a point of termination to the destination node using a regular path determined by the local routing table.

5. The method of claim 2, wherein the eliminating step further comprising:
for each node, transmitting the node's set of bypass circuits to each descendent node.

6. The method of claim 1, wherein the determining step further comprising:
creating additional bypass circuits not contained in a parent node's set of bypass circuits.

7. The method of claim 1, wherein the bypass circuit is generated to accommodate a traffic flow capacity of one wavelength.

8. The method of claim 1, wherein the bypass circuit is an optical bypass circuit.

9. A system for allocating bypass circuits in a network, comprising:
a plurality of nodes, each node having traffic from one or more source-destination pairs;
one or more bypass circuits, each bypass circuit associated with a select source node and a select destination node; and
a bypass procedure that generates one or more bypass circuits, the bypass procedure having instructions to have one or more nodes in the network
calculate an aggregate traffic flow for all source-destination pairs flowing through each node; and
create one or more bypass circuits if the aggregated traffic flow for a specific source-destination pair is larger than a preset threshold and wherein a sub-set of traffic for the specific source-destination pair is diverted through at least one bypass circuit of the one or more of bypass circuits and a remaining portion of the traffic for the specific source-destination pair is transmitted via a regular path determined by a local routing table.

10. The system of claim 9, wherein the bypass procedure further includes instructions to calculate the aggregate traffic flow by having each node in the network transmit control messages to each descendent node for each source-destination pair flowing through the node, the control message including an aggregated traffic flow specific to each link, each descendent node filters the received aggregated traffic flow by dividing the received aggregated traffic flow into separate aggregated traffic flow based on destination, and for each link having an aggregate traffic flow larger than the preset threshold value, transmits a second control message with a corresponding link specific aggregated traffic flow to a corresponding descendent node.

11. The system of claim 10, wherein the bypass procedure further includes instructions to have a destination node receiving the control message respond to the node originating the control message with the aggregated traffic flows.

12. The system of claim 11, wherein the bypass procedure further includes instructions to have the originating node create a bypass circuit based on the received aggregated traffic flow.

13. The system of claim 9, wherein the bypass procedure further includes instructions to have a node delete bypass circuits already covered by a bypass circuit created by a parent node.

14. The system of claim 9, wherein the bypass circuit is generated to accommodate a traffic flow capacity of one wavelength.

15. The system of claim 9, wherein the select source node and the select destination node of a bypass circuit includes an optical cross connect.

16. The system of claim 9, wherein the bypass circuits are optical bypass circuits.

17. A non-transitory computer readable storage medium having a computer readable program of instructions for execution by a computer, the instruction causing the computer to perform a method of generating bypass circuits in a network comprising:
a routing table including one or more source-destination pairs used to route data through a network, the network having a plurality of nodes;
a traffic matrix having traffic flow data for each source-destination pair flowing through a node;
a bypass procedure that generates one or more bypass circuits, each bypass circuit associated with a select source node and a select destination node, the bypass procedure having instructions to
calculate an aggregate traffic flow for all source-destination pairs flowing through the node; and
create one or more bypass circuits if the aggregated traffic flow for a specific source-destination pair is larger than a preset threshold and wherein a sub-set of traffic for the specific source-destination pair is diverted through at least one bypass circuit of the one or more of bypass circuits and a remaining portion of the traffic for the specific source-destination pair is transmitted via a regular path determined by the routing table.

18. The non-transitory computer readable storage medium of claim 17, wherein the bypass procedure further includes instructions to calculate the aggregate traffic flow by having each node in the network transmit control messages to each descendent node for each source-destination pair flowing through the node, the control message including an aggregated traffic flow specific to each link, each descendent node filters the received aggregated traffic flow by dividing the received aggregated traffic flow into separate aggregated traffic flow based on destination, and for each link having an aggregate traffic flow larger than the preset threshold value, transmits a second control message with a corresponding link specific aggregated traffic flow to a corresponding descendent node.

19. The non-transitory computer readable storage medium of claim 17, wherein the bypass procedure further includes instructions to have a node delete a bypass circuit that is already contained in a bypass circuit created by a parent node.

20. The non-transitory computer readable storage medium of claim 17, wherein the bypass circuits are generated to accommodate a traffic flow capacity of one wavelength.

* * * * *

UNITED STATES PATENT AND TRADEMARK OFFICE
CERTIFICATE OF CORRECTION

PATENT NO.         : 8,472,313 B2                                   Page 1 of 1
APPLICATION NO.    : 12/787600
DATED              : June 25, 2013
INVENTOR(S)        : Karol It is certified that error appears in the above-identified patent and that said Letters Patent is hereby corrected as shown below:

In the Specification:

In Column 4, Line 30, delete "wavelength," and insert -- wavelength, $\lambda_1$, --, therefor.

In Column 7, Line 9, delete "(8W/N)/(2W) (4/N)" and insert -- (8W/N)/(2W)=(4/N) --, therefor.

In Column 8, Line 1, delete "TP routers," and insert -- IP routers, --, therefor.

In the Claims:

In Column 9, Line 39, in Claim 9, delete "network" and insert -- network; --, therefor.

Signed and Sealed this
Fourteenth Day of April, 2015

Michelle K. Lee
*Director of the United States Patent and Trademark Office*